Feb. 2, 1954  H. H. HERMAN  2,667,865
DEVICE FOR FORMING PIPE JOINTS
Filed Dec. 31, 1948

INVENTOR.
HARRY H. HERMAN
BY
ATTORNEYS

Patented Feb. 2, 1954

2,667,865

UNITED STATES PATENT OFFICE 2,667,865

DEVICE FOR FORMING PIPE JOINTS

Harry Hirsch Herman, Denver, Colo.

Application December 31, 1948, Serial No. 68,486

3 Claims. (Cl. 126—263)

This invention relates to pipe joints of the capillary type and particularly to devices for forming the same.

In pipe joints of the capillary type, surfaces of the parts to be joined are telescoped so as to be sufficiently close together, so that when they are heated to the "wetting" temperature (below which difficulty is experienced in forming a strong bond), fusible metal or alloy or the like, such a solder or silver solder, will flow between the surfaces, forming a strong bond upon solidification. The parts to be joined in this manner are ordinarily a pipe and a fitting, such as a coupling, T, L or the like, while the ends of two or more pipes may be joined to the fitting simultaneously. Ordinarily, the attaching surfaces of the parts to be joined are cylindrical, such as the outer surface at the end of a pipe and the inner surface at the end of a fitting. The pipe and fitting are usually made to sufficiently close tolerance so that when the end of the pipe is inserted within the fitting, the surfaces will be sufficiently close together that a space of capillary magnitude is formed. The fusible material may be supplied in the form of an insert or ring disposed within an annular slot in the fitting, in position to flow readily between the surfaces upon melting. Or, the fusible material may be supplied in the form of a wire or rod which is introduced through a hole in the fitting, to be melted and flow between the surfaces to be joined. Previously, the surfaces to be joined have been brought to the "wetting" temperature by heating with a blow torch, air-acetylene flame, or other type of open flame. However, the use of an open flame in installing plumbing lines, for instance, which may pass close to or through wooden beams, flooring, or the like, involves a considerable fire hazard. Also, when the joint is placed close to a wall, for instance, it is difficult and sometimes impossible to reach the side of the joint next to the wall with an open flame, and when such an obstruction is wood or other combustible material, the fire hazard is greatly increased. A number of joints, such as all the joints for one or more rooms, may be made up and the piping placed in the position which it will have upon final production of the joints, after which the joints are heated successively and the fusible material melted and caused to flow to the surfaces to be joined, or melted in situ.

Among the objects of this invention are to provide a novel device for forming a pipe joint or the like of the capillary type, wherein fusible material is caused to flow between telescoped surfaces of the members to be joined; to provide such a device for forming a pipe joint, by which the fire hazard is reduced; to provide such a device by which the heating of individual joints can be more accurately controlled; to provide such a device by which all portions of the surfaces can be heated more uniformly, particularly those portions closely adjacent a beam or other obstruction which would tend to interfere with the application of heat by an open flame; to provide such a device by which the temperature to which the surfaces are heated can be more accurately controlled; to provide such a device which is particularly adapted to be utilized closely adjacent an obstruction such as a beam or pillar; and to provide such a device which is readily made or applied, and saves considerable time and effort in use.

Other objects and the novel features of this invention will become apparent from the following description, taken in connection with the accompanying drawing, in which.

Figure 1:
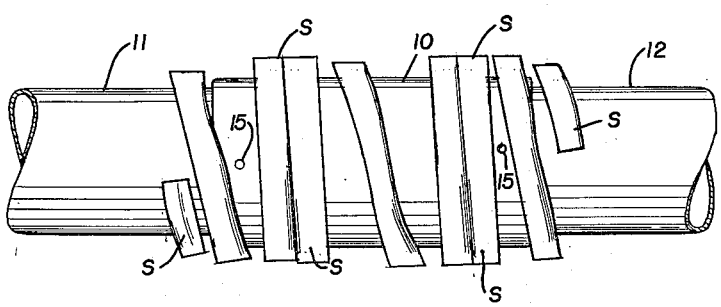
Fig. 1 is a side elevation of a pipe joint of the capillary type, illustrating one manner in which the device of this invention may be utilized.
Figure 2:
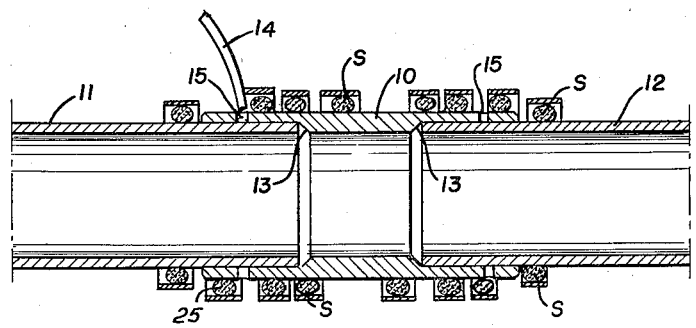
Fig. 2 is a longitudinal section through the pipe joint of Fig. 1.

As shown in Figs. 1 and 2, the device of this invention may be utilized in forming a joint of the capillary type between a pipe fitting, such as a coupling 10, and two pipes 11 and 12. The coupling 10 is conventionally formed with an interior recess extending from each end to an inner shoulder 13, against which the ends of the pipes 11 and 12 may abut. The inner surface of the recesses in the coupling 10 are preferably of such diameter that the outer surface of each pipe 11 and 12 will, when the end of the pipe is inserted in the recess, be in sufficiently close juxtaposition to the inner surface of the coupling that a space of capillary magnitude is formed. Normally, the tighter the fit between the pipe and the fitting, the stronger the joint produced. Thus, the outer surface of the pipes 11 and 12 may be of such diameter, with respect to the diameter of the inner surface of the coupling 10, that a relatively tight fit is obtained. However, a strong and reliable joint can be produced even though the space between the surfaces is several thousandths of an inch. Conventionally, the fitting and the pipes are heated by a blow torch, an air-acetylene or other type of flame, so that the surfaces will reach the "wetting" temperature, which is the temperature below which the fusible material, when molten, will not tend to adhere to the surfaces. When the pipe and fitting have been heated to the proper temperature (sometimes quite difficult to judge when produced by an open flame), a fusible metal rod or wire 14 is fitted through a hole 15 in the fitting, the rod 14 being melted by the flame and flowing between the surfaces by capillary action.

In accordance with the present invention, the surfaces are not heated by an open flame or the like, but rather by the conduction of heat from the exterior surface of the fitting and/or pipes, through the heat produced by a strip-like device S which includes a strip 25 of exothermic reaction material or which includes exothermic reaction material, as described later. The device S is wound about the fitting and/or pipes, adjacent the ends of the latter, such as in the manner shown in Figs. 1 and 2, so that when the exothermic reaction is completed, the surfaces will be heated to a temperature above the wetting temperature, so that the fusible rod 14 may be inserted in the hole 15, and will melt upon contact with the surface of the hole and of the pipe therebeneath, the molten metal from the fusible rod 14 flowing between the surfaces by capillary action. The amount of strip S which is wound about the joint is proportioned in accordance with the size of the joint, the amount of metal in the fitting and the pipe ends, the temperature to which the surfaces are to be heated, and the melting point and size of the fusible rod 14. Thus, for a larger joint, or for heating to a higher temperature, it is necessary only to wrap a longer piece of device S about the joint. Usually, in wrapping the strip S about the joint, the turns will be localized over the surfaces to be joined, as shown, although the wrapping may be done in any other suitable manner.

Figure 3:
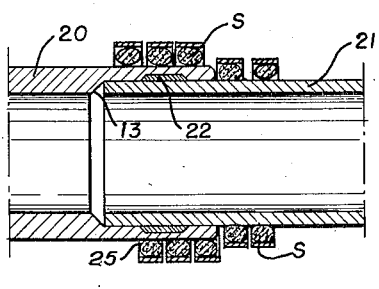
Fig. 3 is a longitudinal section taken through a portion of a fitting and a pipe, at the joint, showing a slightly different type of fitting and illustrating a manner in which the device of this invention can be utilized.

In the alternative form of joint shown in Fig. 3, the device S is wrapped around the joint to be formed between coupling 20 and pipe 21, in somewhat the same manner as in Figs. 1 and 2, although the turns may be relatively close together exteriorly of fusible metal 22, which is carried by coupling 20 within a suitably formed recess therein, adjacent the surfaces to be joined. The fitting 20 may be otherwise similar to fitting 10 of Figs. 1 and 2, being provided with one or more interior shoulders 13 against which the ends of pipe 21 may abut. As will be evident, since the temperature of melting of the fusible metal 22 is usually in excess of the wetting temperature, the inner surface of the coupling 20 and the outer surface of the pipe 21 will tend to be heated above the wetting temperature before the fusible metal 22 melts, the latter then flowing between the surfaces to form the joint.

Instead of a coupling, the fitting at the joint may be an L, T, X or other fitting, in which case the strip may be appropriately wound about the joint. Also, only one connection, instead of a number, may be made at one time, as for instance, the single connection shown in Fig. 3, wherein the device S is wound only about one end of the coupling 20 and the exterior of pipe 21 adjacent thereto. Of course, the device may be wound also about other portions of the coupling 20 to which other pipes are to be joined, or separate strips may be wound about each connection or joint.

Figure 4:
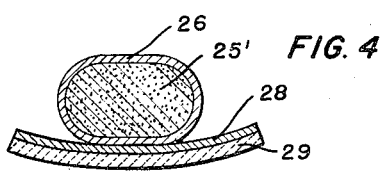
Fig. 4 is an enlarged cross section of a device constructed in accordance with this invention and adapted to be utilized in the manner illustrated in Figs. 1–3.

The device S includes not only the exothermic reaction material 25, but also a heat shield which may be constructed in the manner illustrated in Fig. 4, wherein the exothermic reaction material 25' is relatively loose or consists of a mixture of grains, and is therefore enclosed within a covering 26, the latter being made of metal, woven fabric, cloth or other suitable material, either natural or synthetic. The heat confining shield may comprise a metal plate 28 having a layer 29 of asbestos, refractory, fire resistant, or heat retarding material, mounted thereon or attached thereto on one side with the exothermic reaction material mounted on or attached to the opposite side of plate 28. Plate 28 is wider than the strip of exothermic reaction material, so that the device S may be wound about the joint, as in Figs. 1–3, with, the edges of adjacent convolutions of plate 28 in substantially abutting relationship, so as to confine the heat to the joint. This is particularly advantageous when the device is to be used adjacent a wooden beam or post, or the like, which involves a possible fire hazard.

As used herein, the term "exothermic reaction material" means any material which produces sufficient heat, as through chemical reaction or combination, to heat the surfaces to be joined to the desired temperature. Such material may be similar to that used in fuses, such as a mixture of potassium nitrate, sulphur and charcoal, of sufficiently small diameter that burning rather than explosion is produced. For the production of a minimum amount of fumes, a picrate composition, such as containing ammonium picrate, barium nitrate, and a filler may be used. Or a mixture of potassium chlorate, potassium nitrate, barium carbonate, sugar and stearine may be used. For higher temperatures, material of the thermite type, such as a mixture of iron oxide and aluminum powder, with a filler for temperature and reaction rate control, or a mixture of powdered magnesium and an oxidizing agent such as potassium chlorate or perchlorate, may be used. There are, of course, many other mixtures and materials which will be found suitable for such use.

Preferably, the material is such that it can be formed as a strip or the like, sufficiently flexible that it may be wound about the joint, and for this purpose may be a string or similar length of cotton or other suitable fibrous material which carries, or is saturated with, the exothermic reaction material. Normally, the reaction of the exothermic material is started by ignition, i. e. by heat, as by applying a match or other source of heat thereto, or providing the end of the strip 25 or 25' with a fuse which will produce a much smaller amount of heat, yet sufficient to start the principal reaction.

An advantage of forming a pipe joint of the capillary type in accordance with the method of this invention, lies in the fact that the heating may proceed relatively rapidly, so that an undue amount of heat is not lost by conduction through the pipes. Also, the heat is supplied evenly about the joint and relatively inaccessible portions of the joint are heated equally as more accessible portions, so that a strong, tight joint and a complete seal entirely around the periphery of the joint, are assured. As indicated previously, the strip S may be cut to a predetermined length in accordance with the size of joint and fusible material to be heated, or a coil or the like, comprising a relatively long strip, may be cut into desired lengths as needed.

Although one embodiment of this invention has been illustrated and described, it will be understood that other embodiments may exist; that the exothermic reaction material may be a different type than those described specifically; that the parts to be joined need not be cylindrical, but may be square, octagonal or have other shape, and also may be tapered; and that various other changes may be made, all without departing from the spirit and scope of this invention.

What is claimed is:

1. A device for forming pipe joints of the capillary type, comprising a strip of exothermic reaction material adapted to be wound about the exterior surface of a member, said strip having a heat confining shield on one side thereof wider than said strip, said strip being adapted to be disposed with said shield on the outside and with the edges of adjacent convolutions of said shield in substantially abutting relationship, said heat confining shield comprising a strip of metal extending along one side only of said reaction strip and attached thereto, and a layer of heat retarding material on the opposite side of said metal strip.

2. A device for forming pipe joints of the capillary type, as defined in claim 1, wherein said heat retarding material is asbestos.

3. A device for forming pipe joints of the capillary type, as defined in claim 1, wherein said exothermic reaction material is granular and is enclosed within a covering.

HARRY HIRSCH HERMAN.

References Cited in the file of this patent

UNITED STATES PATENTS

| Number | Name | Date |
|---|---|---|
| 934,711 | Chapman | Sept. 21, 1909 |
| 1,151,679 | Graves | Aug. 31, 1915 |
| 1,662,945 | Wielage | Mar. 20, 1928 |
| 1,770,852 | Hill | July 15, 1930 |
| 1,776,502 | Gresely et al. | Sept. 23, 1930 |
| 1,801,171 | Mueller et al. | Apr. 14, 1931 |
| 2,018,117 | Birk | Oct. 22, 1935 |
| 2,146,393 | Burrell | Feb. 7, 1939 |
| 2,174,218 | Greene | Sept. 26, 1939 |
| 2,224,145 | Dugan et al. | Dec. 10, 1940 |
| 2,314,950 | Pope | Mar. 30, 1943 |
| 2,450,120 | Cate | Sept. 28, 1948 |

FOREIGN PATENTS

| Number | Country | Date |
|---|---|---|
| 736 | Great Britain | of 1914 |

OTHER REFERENCES

Product Engineering, September 1947, page 164, last paragraph 113–110.